United States Patent
Jaros et al.

(10) Patent No.: US 10,922,211 B2
(45) Date of Patent: Feb. 16, 2021

(54) TESTING RESPONSES OF SOFTWARE APPLICATIONS TO SPATIOTEMPORAL EVENTS USING SIMULATED ENVIRONMENTS

(71) Applicant: Red Hat, Inc., Raleigh, NC (US)

(72) Inventors: Miroslav Jaros, Brno (CZ); Stefan Bunciak, Brno (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 16/403,947

(22) Filed: May 6, 2019

(65) Prior Publication Data
US 2020/0356463 A1   Nov. 12, 2020

(51) Int. Cl.
G06F 11/36   (2006.01)

(52) U.S. Cl.
CPC ...... *G06F 11/3664* (2013.01); *G06F 11/3688* (2013.01); *G06F 11/3692* (2013.01)

(58) Field of Classification Search
CPC ............. G06F 11/3664; G06F 11/3688; G06F 11/3692
USPC ......................................................... 717/135
See application file for complete search history.

(56) References Cited

U.S. PATENT DOCUMENTS

| | | |
|---|---|---|
| 8,930,880 B2 | 1/2015 | Weatherhead |
| 9,519,520 B2 | 12/2016 | Krueger et al. |
| 9,709,965 B2 | 7/2017 | Slessman et al. |
| 2010/0257009 A1 | 10/2010 | Liu et al. |
| 2017/0193144 A1* | 7/2017 | Ko .......................... G06F 30/20 |
| 2017/0255829 A1* | 9/2017 | Chang .................. H04N 5/2224 |
| 2018/0070872 A1* | 3/2018 | Simon .................... A61B 5/168 |
| 2018/0165531 A1* | 6/2018 | Sathyanarayana ... G06K 9/6218 |

(Continued)

FOREIGN PATENT DOCUMENTS

CN        104767829     *  7/2015    ............ H04L 29/08

OTHER PUBLICATIONS

Alsobeh, A.M.R., et al., "An Aspect-Oriented with BIP Components for Better Crosscutting Concerns Modernization in IOT Applications," Department of Computer Information System, Yarmouk University, Aug. 2018, https://www.researchgate.net/publication/327338481_An_Aspect-Oriented_With_BIP_Components_for_Better_Crosscutting_Concerns_Modernization_in_IOT_Applications.

(Continued)

*Primary Examiner* — John Q Chavis
(74) *Attorney, Agent, or Firm* — Kilpatrick Townsend & Stockton LLP

(57) ABSTRACT

Responses of software applications to spatiotemporal events can be tested using simulated environments. In one example, a system can generate a simulated environment having simulated distributed devices positioned at various spatial locations in the simulated environment. The system can then simulate a spatiotemporal event propagating through the simulated environment by modifying a device simulation property of each simulated distributed device based on the spatiotemporal event and a respective spatial location of the simulated distributed device in the simulated environment. This can produce simulation outputs impacted by the spatiotemporal event. The system can then provide the simulation outputs as input to a target software application to test a response to the spatiotemporal event by the target software application.

20 Claims, 4 Drawing Sheets

(56) References Cited

U.S. PATENT DOCUMENTS

2018/0189328 A1   7/2018  Frazier et al.
2019/0114485 A1*  4/2019  Chan ..................... H04N 21/80

OTHER PUBLICATIONS

Soldatos, J., "Overview and Accomplishment of the H2020 IoT Security/Privacy Cluster Projects," Athens Information Technology, Oct. 22, 2018, https://docbox.etsi.org/Workshop/2018/201810_IoTWEEK/01_IoTSECURITY_PRIVACY/SESSION01/ATHENSINFORMATIONTECHNOLOGY_SOLDATOS.pdf.

Weyns, D., et al., "Self-Managing Internet of Things," Department of Computer Science, KU Leuven Belgium, University of Southern California, 2018, https://people.cs.kuleuven.be/~danny.weyns/papers/2018SOFSEM.pdf.

Akopyan, V., "Simulating hundreds of IoT devices with Kubernetes," 2018, https://blog.quickbird.uk/simulating-iot-devices-with-kubernetes-e6f2ccf02f3.

Rothermel, R.C., "A Mathematical Model for Predicting Fire Spread in Wildland Fuels," USDA Forest Service, Research Paper INT-115, 1972.

* cited by examiner

TESTING RESPONSES OF SOFTWARE APPLICATIONS TO SPATIOTEMPORAL EVENTS USING SIMULATED ENVIRONMENTS

TECHNICAL FIELD

The present disclosure relates generally to software testing. More specifically, but not by way of limitation, this disclosure relates to testing responses of software applications to spatiotemporal events using simulated environments.

BACKGROUND

Recently, there has been a proliferation of distributed devices. Distributed devices are electronic devices configured to form part of a distributed system (an ecosystem of electronic devices collectively working together to achieve a common goal). The distributed devices typically detect a variety of environmental conditions using sensors and transmit data associated with such environmental conditions to a software application, which may be executing in a cloud computing environment. The software application can receive the data from the distributed devices and respond to the data in a variety of ways.

DETAILED DESCRIPTION

Figure 1:
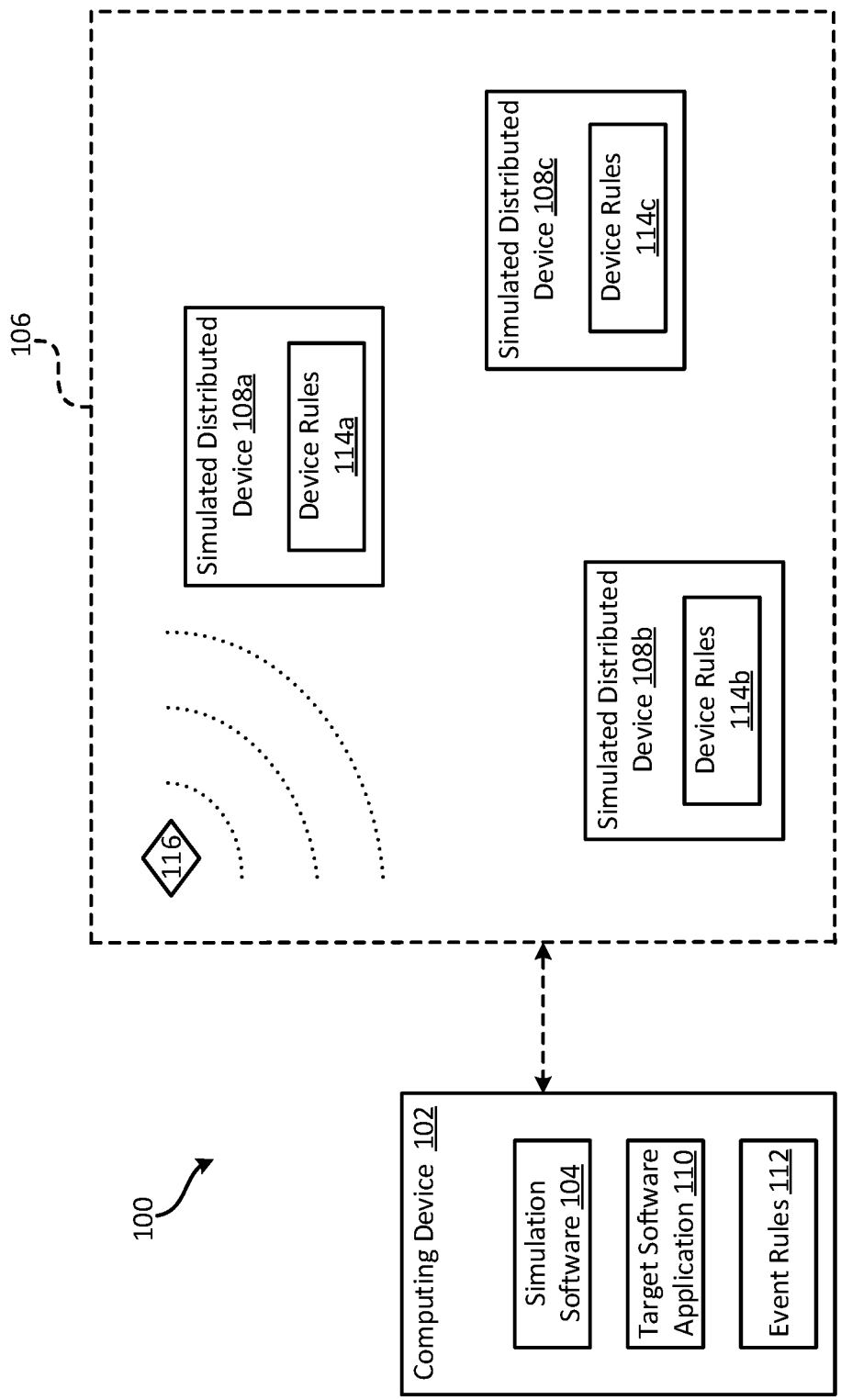
FIG. 1 depicts a block diagram of an example of a system for testing responses of software applications to spatiotemporal events using simulated environments according to some aspects.

Spatiotemporal events can affect a distributed system of distributed devices in different ways over time. A spatiotemporal event is any event that has both spatial and temporal qualities, for example an event that changes in spatial impact over time, such as a fire or natural disaster. Due to the complex nature of spatiotemporal events, it can be challenging to test how a software application designed for use with the distributed devices will respond to such events. For example, a software developer may be developing a software application configured to receive inputs from distributed devices in a real-world environment and respond to such inputs. To fully test the software application, the software developer may wish to test how the software application responds to a spatiotemporal event propagating through the real-world environment. But there are currently no easy or effective ways to do so. For example, a software developer may have to actually create a network of distributed devices and manually manipulate the distributed devices (e.g., by shaking them, holding a flame near them, blowing air or smoke on them, etc.) over time to mimic the spatiotemporal event and thereby test the software application. This is time consuming, rudimentary, and inaccurate.

Some examples of the present disclosure overcome one or more of the abovementioned issues through the use of simulation software that can generate simulated distributed devices and manipulate them to produce simulation outputs emulating how a spatiotemporal event impacts the simulated distributed devices over space and time. The simulation outputs can then be supplied as input to a target software application to test how the target software application would respond to the spatiotemporal event. This can enable developers to more quickly and accurately test their software applications.

More specifically, a system of the present disclosure can execute simulation software to generate a simulated environment with simulated distributed devices. The simulated environment can emulate physical characteristics of a real-world environment. For example, the simulated environment can be a three-dimensional (3D) environment that mimics the physical properties of its real-world analogue through simulated changes in pressure, temperature, visibility, ambient light, sound types or levels, or any combination of these. And the simulated distributed devices can emulate the physical distributed devices corresponding thereto in the real world. For example, the simulated distributed devices can be simulated Internet-of-Things (IOT) devices that mimic how their real-world analogues operate. The simulated distributed devices can be positioned at various spatial locations (e.g., 3D coordinates) in the simulated environment imitating how they would actually be positioned in the real world. The system can then run a simulation using the simulated environment to produce simulation outputs.

In some examples, the simulation can at least partially involve emulating a spatiotemporal event occurring in the real world to test a response of the target software application to such an event. For example, the system can simulate a fire spreading spatially through the simulated environment over a series of time steps. To do so, the system can modify device simulation properties associated with the simulated distributed devices at each time step based on (i) an event characteristic at the time step, and (ii) the respective spatial locations of the simulated distributed devices in the simulated environment at the time step. This can produce simulation outputs that are at least partially impacted by the simulated spatiotemporal event. The system can then provide those simulation outputs to a target software application to test the target software application.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for testing responses of software applications to spatiotemporal events using simulated environments. In this example, the system 100 includes a computing device 102, such as a server or desktop computer. The computing device 102 includes simulation software 104 for generating a simulated environment 106. The simulated environment 106 can be configured to mimic the physical properties of a real-world environment. For example, the simulated environment 106 can have one or more simulated environmental properties, such as a simulated temperature, pressure, ambient-light level, time-of-day, or sound level, which may or may not dynamically change over the course of a simulation. In some examples, the simulation software 104 is included in a container image that is deployable using a container-deployment engine (e.g., Docker™) to generate the simulated environment 106 in a cloud computing environment.

The simulation software 104 can also generate one or more types of simulated distributed devices 108a-c within the simulated environment 106. The simulated distributed devices 108a-c are simulated analogues of physical distributed devices in the real world. For example, the simulated distributed devices 108a-c can be simulated IOT devices configured to emulate the behavior of physical IOT devices in the real world.

The simulated distributed devices 108a-c have device simulation properties that may or may not dynamically change over the course of a simulation. The device simulation properties are at least partially governed by device rules 114a (e.g., statistical distributions, mathematical functions, or mathematical models) characterizing the behavior of the physical distributed devices in the real world. As one example, the simulated distributed devices 108a-c can produce simulated sensor measurements that are governed by a statistical distribution, such as a normal distribution. This, in turn, may be dependent on one or more other factors, such as a simulated environmental property in the simulated environment 106. As another example, the simulated distributed devices 108a-c can have simulated operational states that are governed by a mathematical function. This, in turn, may be dependent on one or more other factors, such as a simulated environmental property in the simulated environment 106.

The computing device 102 can execute a simulation associated with the simulated environment 106 over a series of time steps to obtain simulation outputs. The simulation outputs can indicate, for example, simulated sensor measurements from the simulated distributed devices 108a-c or simulated operational states of the simulated distributed devices 108a-c. The computing device 102 may then provide the simulation outputs as input to a target software application 110 (e.g., an IOT application), to elicit a response from the target software application 110. Examples of the response can include an error or a certain output. A developer of the target software application 110 can assess this response and correct the target software application 110, if needed.

In some cases, a developer may wish to determine how the target software application 110 would respond to dynamically changing conditions in the real world, particularly where the conditions that are dynamically changing in response to a spatiotemporal event, such as a fire, earthquake, explosion, etc. So, some examples of the present disclosure can simulate the propagation of a spatiotemporal event through the simulated environment 106 over a series of time steps. This can produce simulation outputs that are impacted by the simulated spatiotemporal event. These simulation outputs can then be provided as input to the target software application 110, to enable a developer to see how the target software application 110 would respond to such a spatiotemporal event.

To simulate the spatiotemporal event 116, the system 100 can include one or more event rules 112 (e.g., statistical distributions, mathematical functions, or mathematical models) characterizing the behavior of the spatiotemporal event in the real world. For example, the spatiotemporal event 116 to be simulated can be a wildfire. In some such examples, the system 100 can simulate the wildfire in the simulated environment 106 by using event rules 112 comprising the mathematical model(s) found in Richard C. Rothermel, A Mathematical Model for Predicting Fire Spread in Wildland Fuels, USDA Forest Service Research Paper, INT-115 (1972). The system 100 can include any number and combination of event rules to simulate any number and combination of spatiotemporal events in the simulated environment 106.

The system 100 may also receive one or more user customizations as to how to simulate the spatiotemporal event 116 in the simulated environment 106. For example, a user may be able to specify a starting location, ending location, trajectory, path, speed, starting intensity, ending intensity, or other property of the spatiotemporal event 116 to be simulated in the simulated environment 106. The system 100 can then simulate the spatiotemporal event 116 in accordance with such user customizations.

In some examples, the system 100 can simulate the spatiotemporal event 116 by modifying the device simulation properties (defined by the device rules 114a-c) based on event characteristics (defined by the event rules 112). For example, the system 100 can determine location information associated with the simulated distributed device 108a in the simulated environment 106. In some examples, the location information includes an absolute location of the simulated distributed device 108a in the simulated environment 106, a relative location of the simulated distributed device 108a in relation to the spatiotemporal event 116 in the simulated environment 106, or a distance between the simulated distributed device 108a and the spatiotemporal event 116 in the simulated environment 106. The system 100 can then use the location information in combination with the event rules 112 to determine how to modify the device simulation properties for the simulated distributed device 108a. For example, the system 100 can apply the location information (i) as a variable value for a mathematical equation in the event rules 112, (ii) as a function parameter for a function in the event rules 112, (iii) to perform a mapping in a lookup table of the event rules 112, (iv) to determine a distribution value in accordance with a statistical distribution of the event rules 112, or (v) any combination of these. This can produce a result indicating how the spatiotemporal event 116 would impact the simulated distributed device 108a given its location in the simulated environment 106. The system 100 can then modify the device simulation properties for the simulated distributed device 108a based on this result. For example, the system 100 can modify the device rules 112a underlying the device simulation properties based on this result, thereby adjusting the device simulation properties. The system 100 can further apply a similar approach to some or all of the other simulated distributed devices 108b-c, based on their respective locations in the simulated environment 106, to modify the device simulation properties thereof.

After modifying the device simulation properties of some or all of the simulated distributed devices 108a-c, the system 100 can then run the simulation to produce simulation outputs (e.g., a set of simulated sensor measurements or a set of simulated operational states of the simulated distribution devices 108a-c) impacted by the spatiotemporal event 116. In some examples, the simulation outputs are for a particular time step. So, the system 100 can repeat this process for each time step to be simulated, modifying the device simulation properties for the simulated distributed devices 114a-c based on the locations of the simulated distributed devices 114a-c in the simulated environment 106 and the event characteristics at the time step, in order to produce a group of simulation outputs. The group of simulation outputs can indicate the impact of the spatiotemporal event 116 propagating through the simulated environment 106 (e.g., as depicted with dotted lines in FIG. 1) on the simulated distributed devices 108*a-c*. This process is described in greater detail below with respect to FIG. 2. The group of simulation outputs can then be provided as input to the target software application 110, for example, to obtain insights into the target software application 110 may respond to a real-world analogue of the spatiotemporal event 116.

Figure 2:
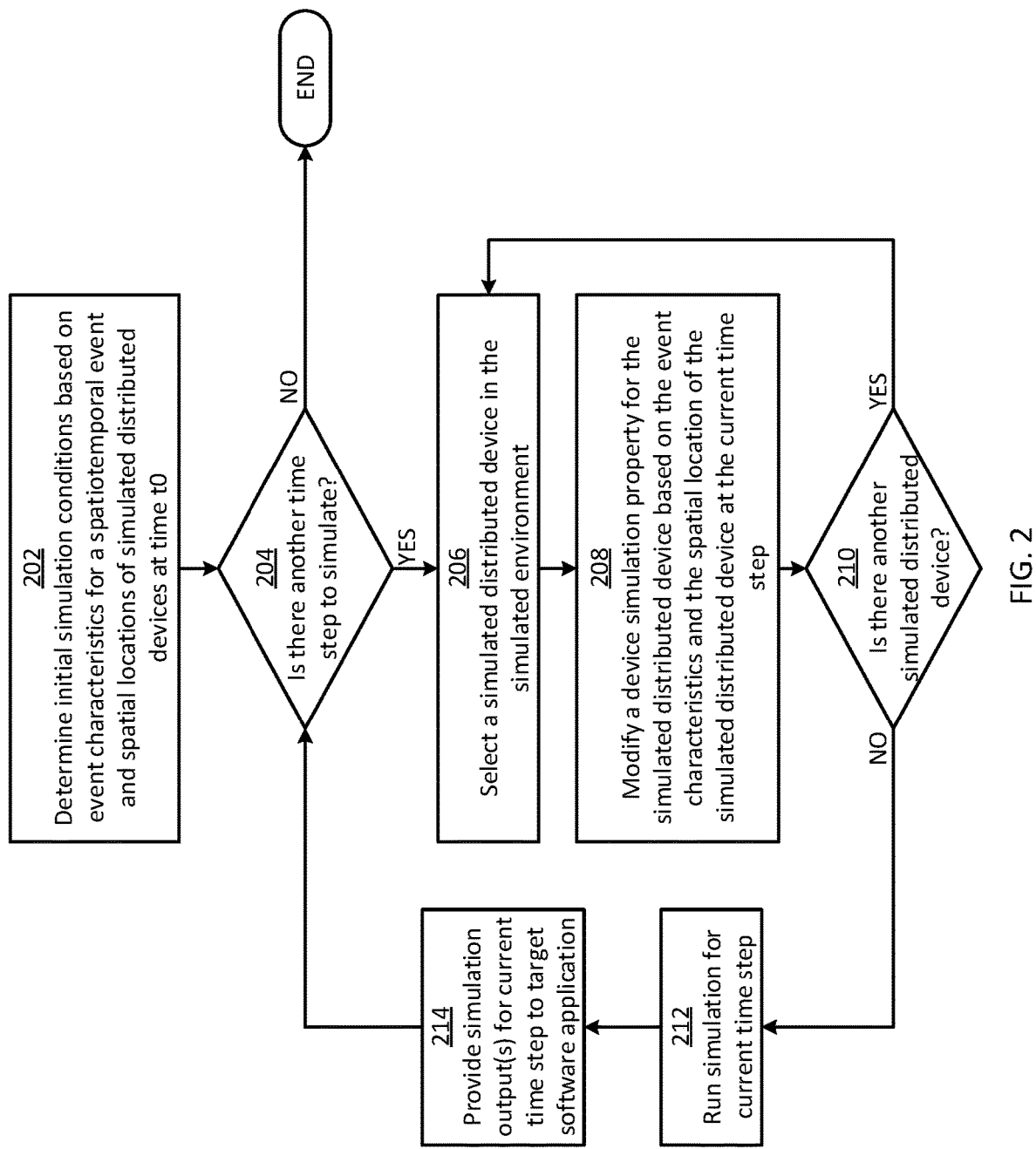
FIG. 2 depicts a flow chart of an example of a process for testing responses of software applications to spatiotemporal events using simulated environments according to some aspects.

FIG. 2 depicts a flow chart of an example of a process for testing responses of software applications to spatiotemporal events using simulated environments according to some aspects. Other examples can include more steps, fewer steps, different steps, or a different order of the steps than is shown in FIG. 2. The steps of FIG. 2 are discussed below with reference to the components discussed above in relation to FIG. 1.

In block 202, a computing device 102 determines initial simulation conditions based on (i) event characteristics for a spatiotemporal event 116 at time t0, and (ii) spatial locations of simulated distributed devices 108*a-c* in a simulated environment 106 at time t0. For example, this step may involve setting initial or default values for the simulated environmental properties associated with the simulated environment 106. Additionally or alternatively, this step may involve setting initial or default values for device rules 114*a-c* associated with the simulated distributed devices 108*a-c*. Additionally or alternatively, this step may involve setting initial or default values for event characteristics associated with the spatiotemporal event 116.

In block 204, the computing device 102 determines if there are any other time steps to simulate. For example, the user may specify that a series of 100 consecutive time steps are to be simulated, where t0 is just the first time step in the series. If the computing device 102 determines that there is another time step to simulate (e.g., that the end of the series of time steps has not yet been reached), the process continues to block 206. Otherwise, the process can end.

In block 206, the computing device 102 selects a simulated distributed device 108*a* in the simulated environment 106. For example, the computing device 102 can select a simulated distributed device 108*a* from among a group of simulated distributed devices 108*a* in the simulated environment 106.

In block 208, the computing device 102 modifies at least one device simulation property for the simulated distributed device 108*a*. The computing device 102 may or may not modify the at least one device simulation property based on the event characteristics at the current time step and the spatial location of the simulated distributed device 108*a* at the current time step. For example, the computing device 102 can modify device rules 114*a* (e.g., a mathematical distribution or a mathematical function thereof) defining the device simulation property. The computing device 102 may modify the device rules 114*a* based on the event characteristics at the current time step and the spatial location of the simulated distributed device 108*a* at the current time step. In this way, one or more device simulation properties can be modified over time, e.g., as the event characteristics change and/or the spatial location of the simulated distributed device 108*a* changes.

In block 210, the computing device 102 determines if there is another simulated distributed device 108*b* that needs to have its device rules 112*a-c* modified for the current time step. If so, the process returns to block 206 and repeats. Once all of the simulated distributed devices 108*a-c* have had their device rules 112*a-c* modified for the current time step, the process can proceed to block 212.

In block 212, the computing device 102 can run the simulation (e.g., by executing the simulation software 104) for the current time step. This can produce simulation outputs for the current time step that are at least partially impacted by the spatiotemporal event 116.

In block 214, the computing device 102 provides the simulation output(s) for the current time step as input to a target software application 110, for example, to determine how the target software application 110 responds to the simulation outputs. The computing device 102 may also log the results of this step, which may later be reviewed by a developer of the target software application 110. The process may then return to block 204 and iterate as needed. In this way, the target software application 110 can be tested under a variety of simulated conditions, and more particularly under dynamically changing conditions in response to a simulated spatiotemporal event 116.

Figure 3:
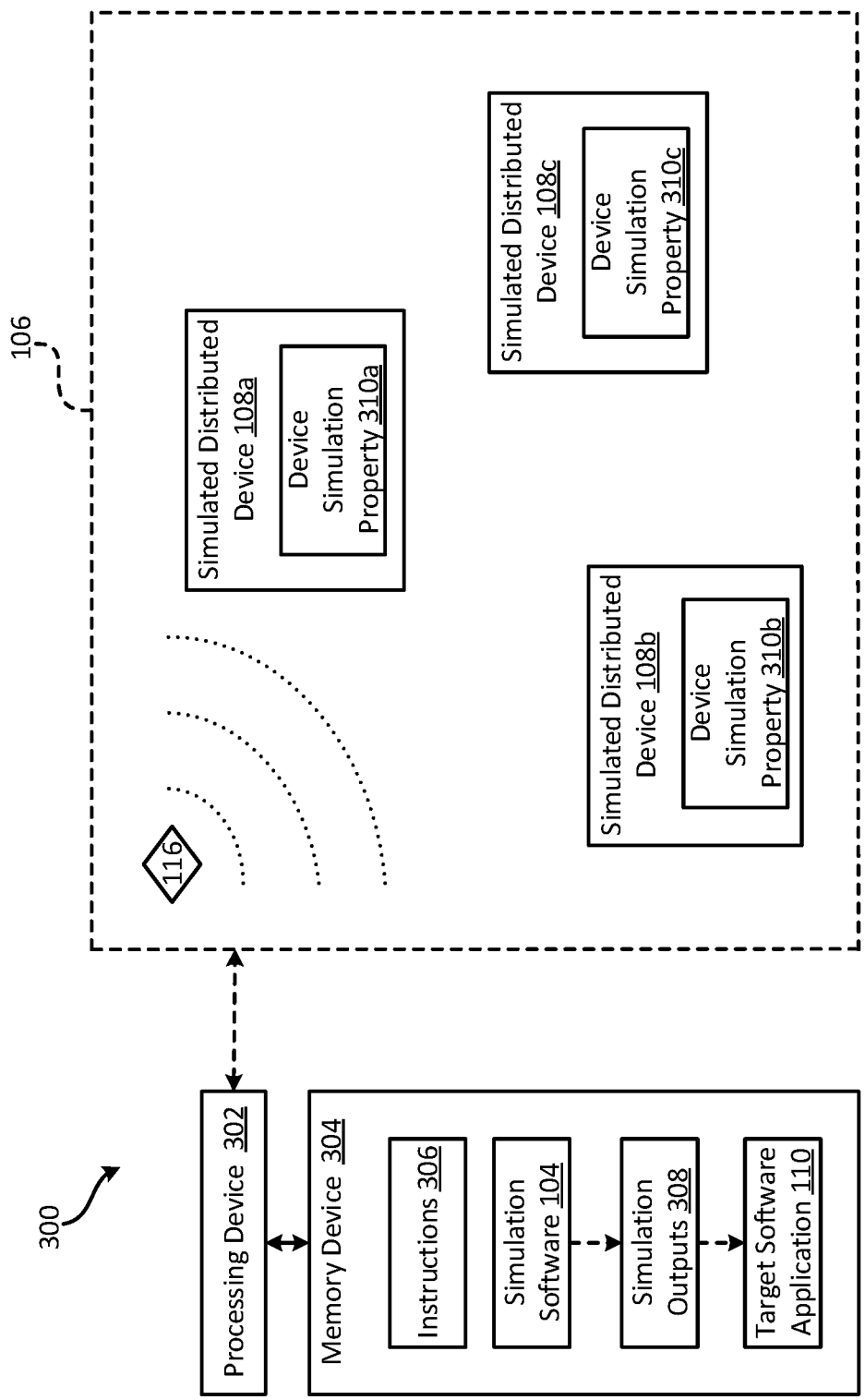
FIG. 3 depicts a block diagram of another example of a system for testing responses of software applications to spatiotemporal events using simulated environments according to some aspects.

FIG. 3 depicts a block diagram of another example of a system 300 for testing responses of software applications to spatiotemporal events using simulated environments according to some aspects. The components shown in FIG. 3 are exemplary, and other examples can include more components, fewer components, different components, or a different configuration of the components shown in FIG. 3.

The system 300 includes a processing device 302 communicatively coupled with a memory device 304. In some examples, the processing device 302 and the memory device 304 can be part of a computing device, such as computing devices 102. The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C #, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. A computer-readable medium can include electronic, optical, magnetic, or other storage devices capable of providing the processing device 302 with computer-readable instructions 306 or other program code. Non-limiting examples of a computer-readable medium include magnetic disk(s), memory chip(s), ROM, random-access memory (RAM), an ASIC, a configured processing device, optical storage, or any other medium from which a computer processing device can read the instructions 306.

In some examples, the processing device 302 can execute simulation software 104 to generate a simulated environment 106 having simulated distributed devices 308*a-c* positioned at various spatial locations in the simulated environment 106. The simulated distributed devices 308*a-c* are configured to emulate operation of physical distributed devices corresponding to the simulated distributed devices 308a-c. The processing device 302 can then simulate a spatiotemporal event 116 propagating through the simulated environment 106 by modifying a device simulation property 310a-c of each simulated distributed device 108a-c based on the spatiotemporal event 116 and a respective spatial location of the simulated distributed device 108a-c in the simulated environment 106. This can produce simulation outputs 308 impacted by the spatiotemporal event 116. The processing device 302 can then test how a target software application 110 responds the spatiotemporal event 116 by providing the simulation outputs 308 as input to the target software application 110. The target software application 110 is separate from the simulated environment 106.

Figure 4:
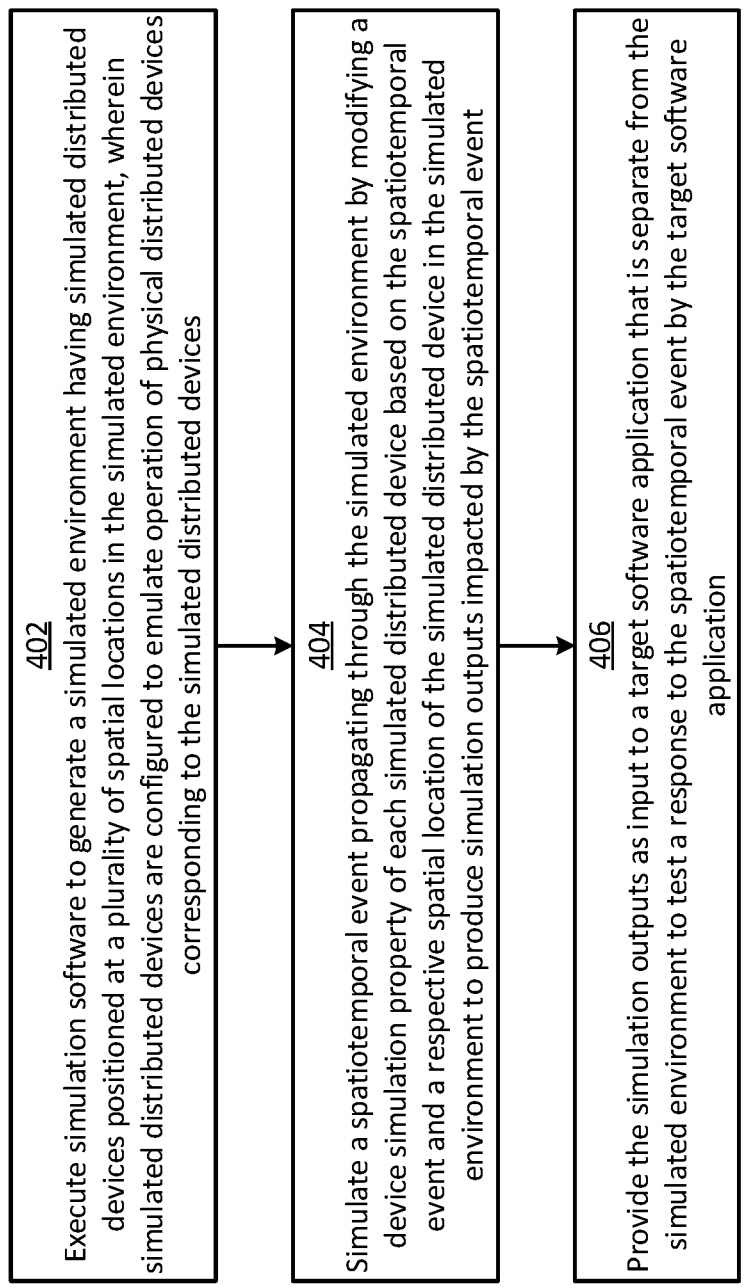
FIG. 4 depicts a flow chart of another example of a process for testing responses of software applications to spatiotemporal events using simulated environments according to some aspects.

FIG. 4 depicts a flow chart of another example of a process for testing responses of software applications to spatiotemporal events using simulated environments according to some aspects. Other examples can include more steps, fewer steps, different steps, or a different order of the steps than is shown in FIG. 4. The steps of FIG. 4 are discussed below with reference to the components discussed above in relation to FIG. 3.

In block 402, a processing device 302 executes simulation software 104 to generate a simulated environment 106 having simulated distributed devices 308a-c positioned at a plurality of spatial locations in the simulated environment 106. The simulated distributed devices 308a-c are configured to emulate operation of physical distributed devices corresponding to the simulated distributed devices 308a-c.

In block 404, the processing device 302 simulates a spatiotemporal event 116 propagating through the simulated environment 106 by modifying a device simulation property 310a-c of each simulated distributed device 108a-c based on the spatiotemporal event 116 and a respective spatial location of the simulated distributed device 108a-c in the simulated environment 106. This can produce simulation outputs 308 impacted by the spatiotemporal event 116.

In block 406, the processing device 302 provides the simulation outputs 308 as input to a target software application 110 that is separate from the simulated environment 106 to test a response to the spatiotemporal event 116 by the target software application 110.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s) to yield further examples.

The invention claimed is:

1. A system comprising:
a processing device; and
a memory device including instructions that are executable by the processing device for causing the processing device to:
execute simulation software to generate a simulated environment having simulated distributed devices positioned at a plurality of spatial locations in the simulated environment, wherein simulated distributed devices are configured to emulate operation of physical distributed devices corresponding to the simulated distributed devices;
simulate a spatiotemporal event propagating through the simulated environment by modifying a device simulation property of each simulated distributed device based on the spatiotemporal event and a respective spatial location of the simulated distributed device in the simulated environment to produce simulation outputs impacted by the spatiotemporal event; and
provide the simulation outputs as input to a target software application that is separate from the simulated environment to test a response to the spatiotemporal event by the target software application.

2. The system of claim 1, wherein the device simulation property is defined by a mathematical distribution, and modifying the device simulation property comprises modifying the mathematical distribution.

3. The system of claim 1, wherein the device simulation property is defined by a mathematical function, and modifying the device simulation property comprises modifying the mathematical function.

4. The system of claim 1, wherein the spatiotemporal event is simulated as spatially propagating through the simulated environment over a series of time steps by modifying the device simulation property of each simulated distributed device at each time step in the series based on (i) an event characteristic at the time step, and (ii) the respective spatial location of the simulated distributed device in the simulated environment at the time step.

5. The system of claim 1, wherein the spatiotemporal event is simulated as spatially propagating through the simulated environment based on a distance between (i) the spatiotemporal event in the simulated environment, and (ii) the respective spatial location of the simulated distributed device in the simulated environment.

6. The system of claim 1, wherein the simulated distributed devices are simulated Internet-of-Thing (IOT) devices, the physical distributed devices are physical IOT devices, and the target software application is an IOT application configured to receive inputs from the physical IOT devices.

7. The system of claim 1, wherein the memory device further comprises instructions that are executable by the processing device for causing the processing device to:
receive a user customization as to how to simulate the spatiotemporal event in the simulated environment; and
simulate the spatiotemporal event in the simulated environment in accordance with the user customization.

8. A method comprising:
executing, by a processing device, simulation software to generate a simulated environment having simulated distributed devices positioned at a plurality of spatial locations in the simulated environment, wherein simulated distributed devices are configured to emulate operation of physical distributed devices corresponding to the simulated distributed devices;
simulating, by the processing device, a spatiotemporal event propagating through the simulated environment by modifying a device simulation property of each simulated distributed device based on the spatiotemporal event and a respective spatial location of the simulated distributed device in the simulated environment to produce simulation outputs impacted by the spatiotemporal event; and
providing, by the processing device, the simulation outputs as input to a target software application that is separate from the simulated environment to test a response to the spatiotemporal event by the target software application.

9. The method of claim 8, wherein the device simulation property is defined by a mathematical distribution, and modifying the device simulation property comprises modifying the mathematical distribution.

10. The method of claim 8, wherein the device simulation property is defined by a mathematical function, and modifying the device simulation property comprises modifying the mathematical function.

11. The method of claim 8, wherein the spatiotemporal event is simulated as spatially propagating through the simulated environment over a series of time steps by modifying the device simulation property of each simulated distributed device at each time step in the series based on (i) an event characteristic at the time step, and (ii) the respective spatial location of the simulated distributed device in the simulated environment at the time step.

12. The method of claim 8, wherein the spatiotemporal event is simulated as spatially propagating through the simulated environment based on a distance between (i) the spatiotemporal event in the simulated environment, and (ii) the respective spatial location of the simulated distributed device in the simulated environment.

13. The method of claim 8, wherein the simulated distributed devices are simulated Internet-of-Thing (IOT) devices, the physical distributed devices are physical IOT devices, and the target software application is an IOT application configured to receive inputs from the physical IOT devices.

14. The method of claim 8, further comprising:
receiving a user customization as to how to simulate the spatiotemporal event in the simulated environment; and
simulating the spatiotemporal event in the simulated environment in accordance with the user customization.

15. A non-transitory computer-readable medium comprising program code that is executable by a processing device for causing the processing device to:
execute simulation software to generate a simulated environment having simulated distributed devices positioned at a plurality of spatial locations in the simulated environment, wherein simulated distributed devices are configured to emulate operation of physical distributed devices corresponding to the simulated distributed devices;
simulate a spatiotemporal event propagating through the simulated environment by modifying a device simulation property of each simulated distributed device based on the spatiotemporal event and a respective spatial location of the simulated distributed device in the simulated environment to produce simulation outputs impacted by the spatiotemporal event; and
provide the simulation outputs as input to a target software application that is separate from the simulated environment to test a response to the spatiotemporal event by the target software application.

16. The non-transitory computer-readable medium of claim 15, wherein the device simulation property is defined by a mathematical distribution, and modifying the device simulation property comprises modifying the mathematical distribution.

17. The non-transitory computer-readable medium of claim 15, wherein the device simulation property is defined by a mathematical function, and modifying the device simulation property comprises modifying the mathematical function.

18. The non-transitory computer-readable medium of claim 15, wherein the spatiotemporal event is simulated as spatially propagating through the simulated environment over a series of time steps by modifying the device simulation property of each simulated distributed device at each time step in the series based on (i) an event characteristic at the time step, and (ii) the respective spatial location of the simulated distributed device in the simulated environment at the time step.

19. The non-transitory computer-readable medium of claim 15, wherein the spatiotemporal event is simulated as spatially propagating through the simulated environment based on a distance between (i) the spatiotemporal event in the simulated environment, and (ii) the respective spatial location of the simulated distributed device in the simulated environment.

20. The non-transitory computer-readable medium of claim 15, wherein the simulated distributed devices are simulated Internet-of-Thing (IOT) devices, the physical distributed devices are physical IOT devices, and the target software application is an IOT application configured to receive inputs from the physical IOT devices.

* * * * *